(12) United States Patent
Steck et al.

(10) Patent No.: US 11,052,803 B2
(45) Date of Patent: Jul. 6, 2021

(54) ROOF HANDLE

(71) Applicant: HERO GmbH, Ittlingen (DE)

(72) Inventors: Volker Steck, Waldbrunn (DE); Martin Meister, Sinsheim (DE); Milto Benjamin, Gütersloh (DE)

(73) Assignee: HERO GMBH

( * ) Notice: Subject to any disclaimer, the term of this patent is extended or adjusted under 35 U.S.C. 154(b) by 0 days.

(21) Appl. No.: 16/904,496

(22) Filed: Jun. 17, 2020

(65) Prior Publication Data

US 2020/0398723 A1    Dec. 24, 2020

(30) Foreign Application Priority Data

Jun. 18, 2019  (DE) ...................... 10 2019 116 492.3

(51) Int. Cl.
*B60N 3/02*    (2006.01)

(52) U.S. Cl.
CPC ............. *B60N 3/023* (2013.01); *B60N 3/026* (2013.01)

(58) Field of Classification Search
CPC ................................ B60N 3/023; B60N 3/026
USPC ......................................................... 296/1.02
See application file for complete search history.

(56) References Cited

U.S. PATENT DOCUMENTS

| | | | | |
|---|---|---|---|---|
| 6,836,932 B2 * | 1/2005 | Yamamoto | ............. | B60N 3/023 16/110.1 |
| 7,922,189 B1 * | 4/2011 | Dillon | ................... | B60R 21/213 280/728.1 |
| 8,764,087 B2 * | 7/2014 | Specht | .................... | B60N 3/026 296/1.02 |
| 9,840,221 B2 * | 12/2017 | England | ................ | B60R 21/232 |
| 10,676,003 B2 * | 6/2020 | Brown | .................... | B60N 3/023 |
| 2003/0126718 A1 * | 7/2003 | Yamamoto | ............. | B60N 3/023 16/110.1 |
| 2004/0140682 A1 * | 7/2004 | Ito | .......................... | B60N 3/026 296/1.02 |
| 2005/0028323 A1 * | 2/2005 | Meyer | .................... | B60N 3/023 16/445 |
| 2007/0267884 A1 * | 11/2007 | Failla | ..................... | B60N 3/026 296/1.02 |
| 2011/0025083 A1 * | 2/2011 | Gupta | .................... | B60N 3/026 296/1.02 |
| 2011/0221170 A1 * | 9/2011 | Thurston | ............... | B60R 13/025 280/728.1 |
| 2011/0291435 A1 * | 12/2011 | Matusko | ................ | B60N 3/026 296/1.02 |

(Continued)

FOREIGN PATENT DOCUMENTS

DE           29604260 U1      3/1996
DE       202013005494 U1     10/2014

*Primary Examiner* — Jason S Morrow
(74) *Attorney, Agent, or Firm* — Boyle Fredrickson, SC

(57) ABSTRACT

A roof handle for vehicles comprises a carrier which can be fixed to a vehicle roof and on which a handle body is pivotably mounted in order to be pivotable between a holding position, in which a user exerts a substantially downwardly directed weight force on the handle body, and a starting position, in which the handle body is pivoted by a spring into a folded-up position with respect to the vehicle roof, the carrier comprising a molded body made of plastic on which at least one insert made of metal is provided, and the handle body being held on the insert made of metal via bearing elements. As a result, the roof handle can have a low dead weight and be optimally adapted to the geometry of a vehicle roof.

18 Claims, 16 Drawing Sheets

(56) References Cited

U.S. PATENT DOCUMENTS

| | | | |
|---|---|---|---|
| 2016/0332593 A1* | 11/2016 | England | B60N 3/026 |
| 2017/0050585 A1* | 2/2017 | Lopez Gonzalez | B60R 13/0212 |
| 2018/0118072 A1* | 5/2018 | Ibrahim | B60N 3/02 |
| 2020/0122620 A1* | 4/2020 | Steinigk | B60N 3/026 |

* cited by examiner

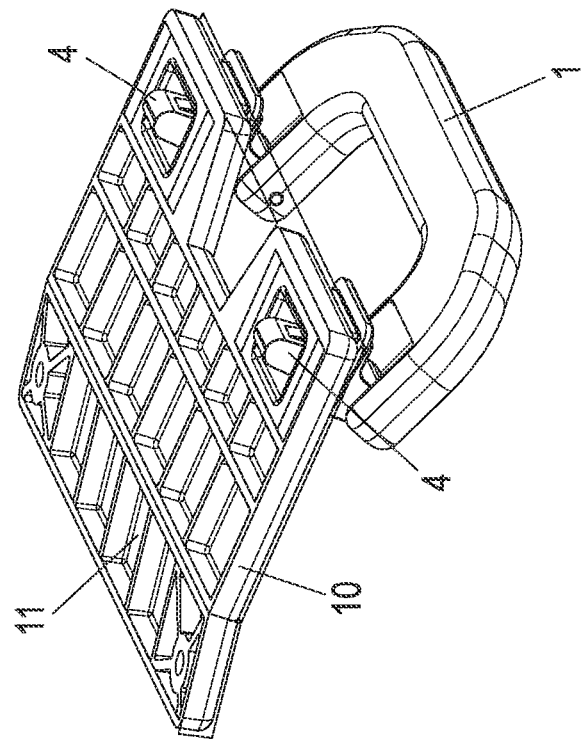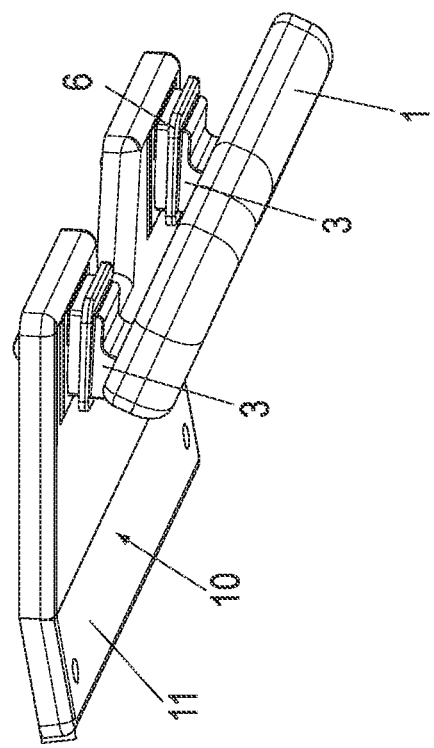

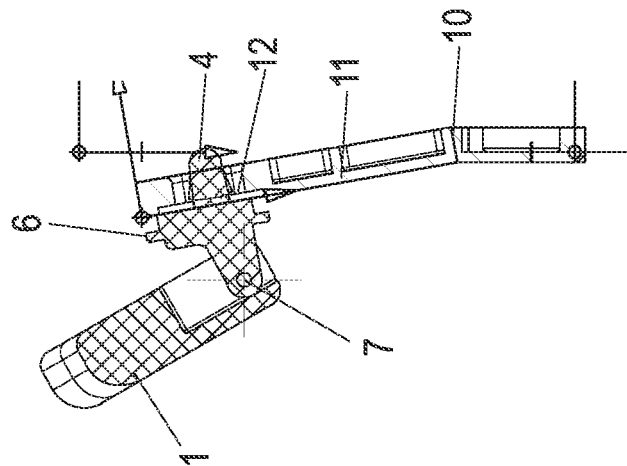
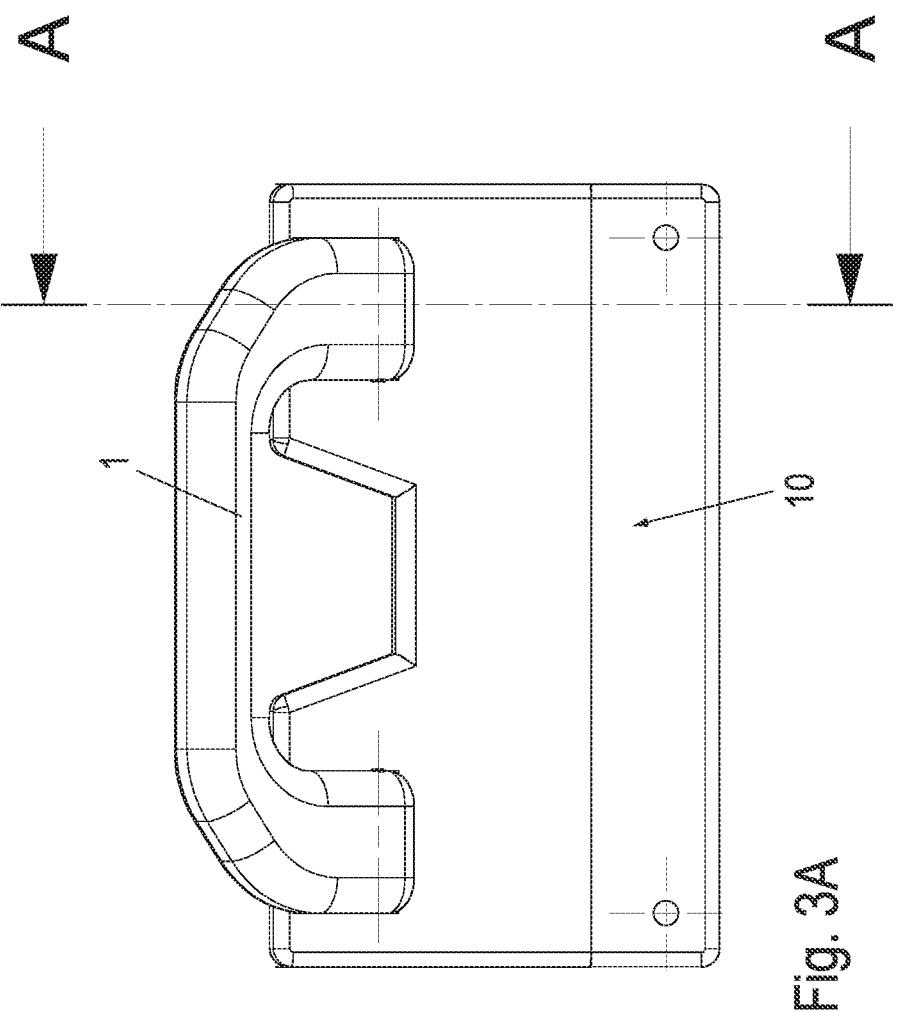

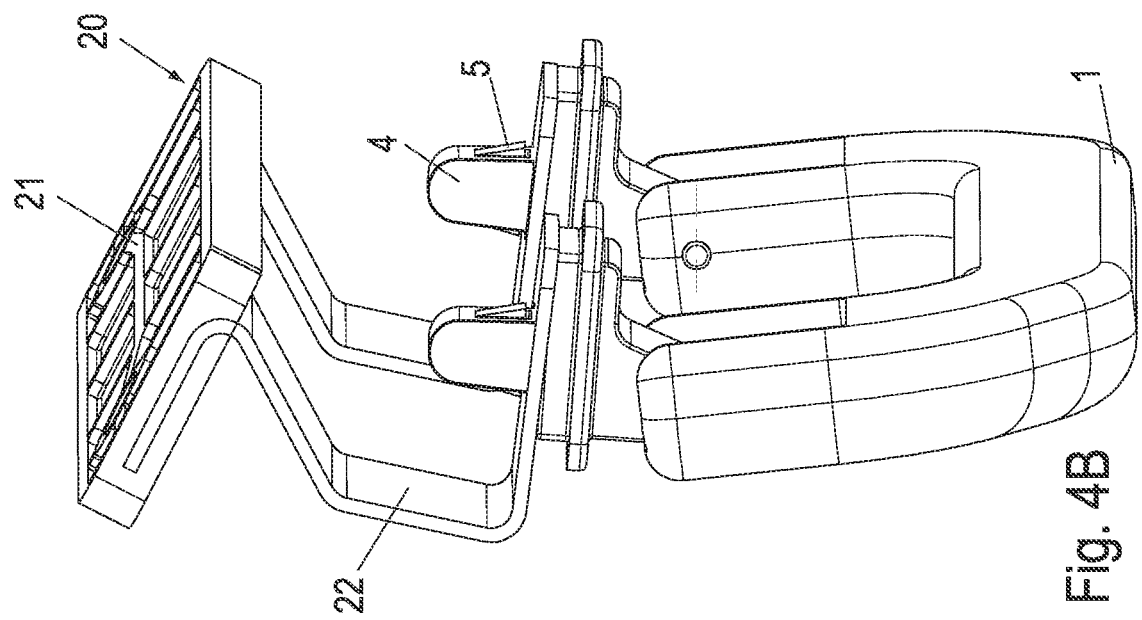
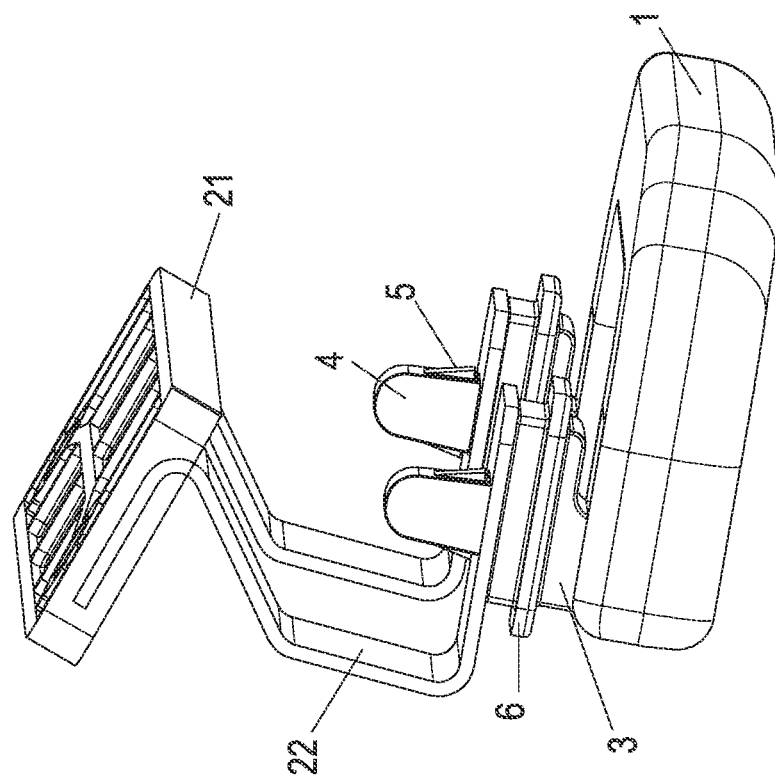
Fig. 4B
Fig. 4A

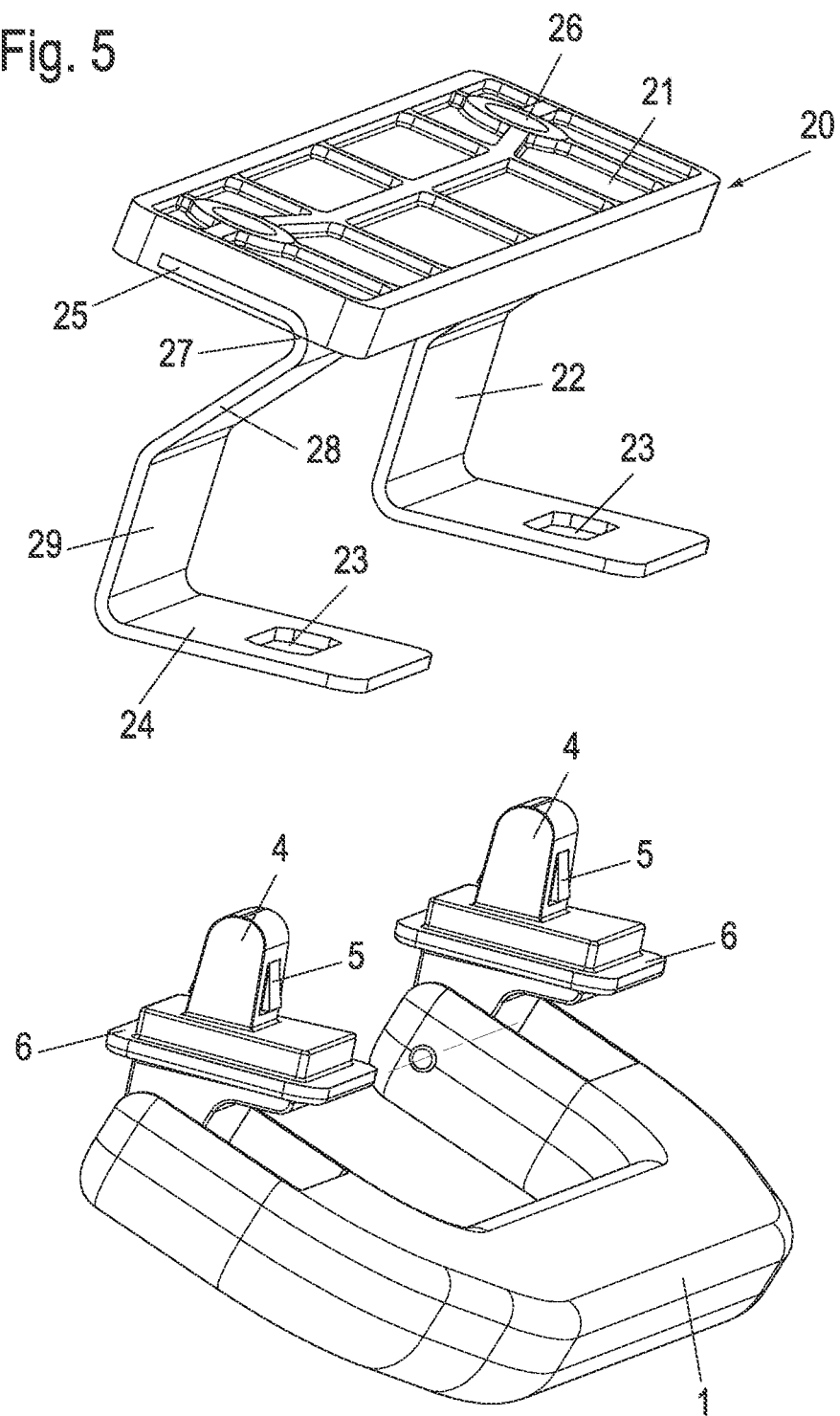

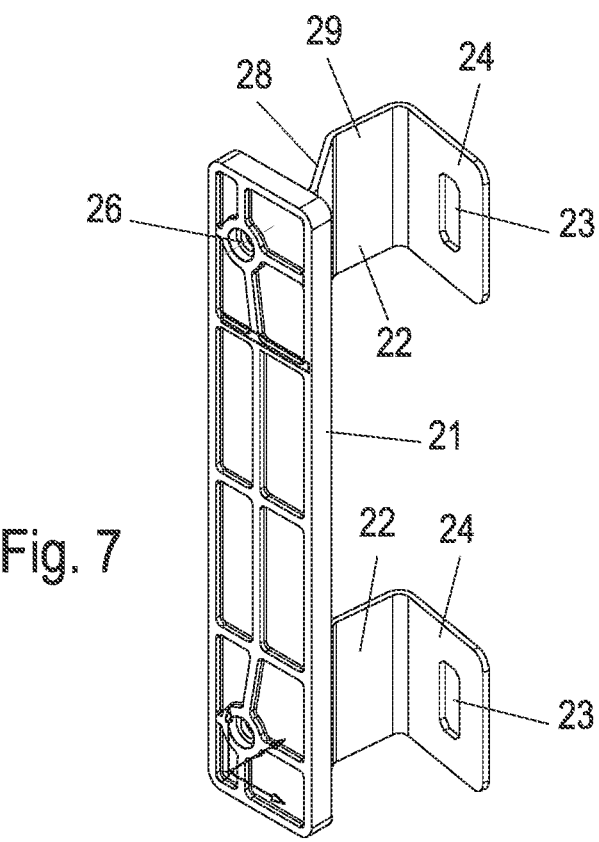
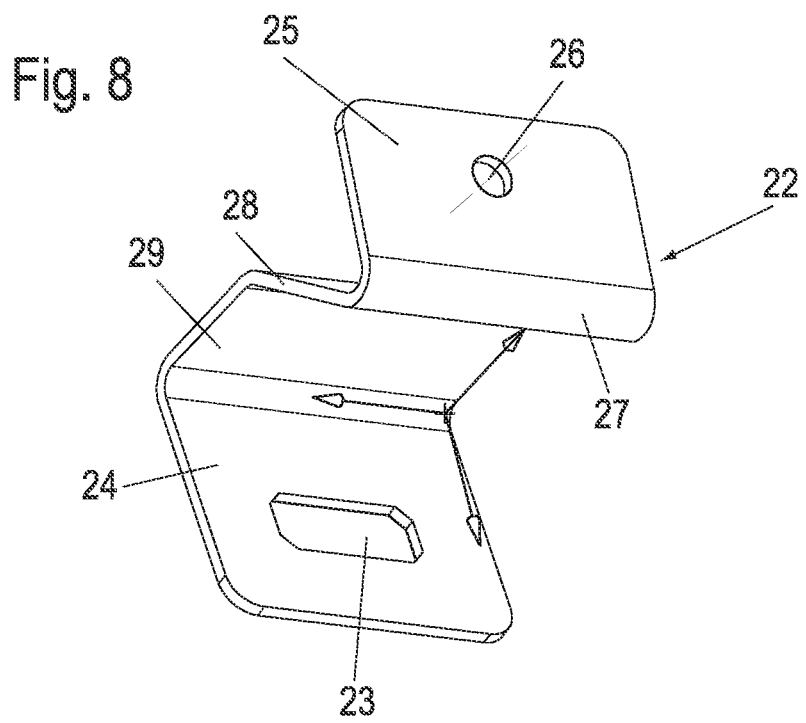

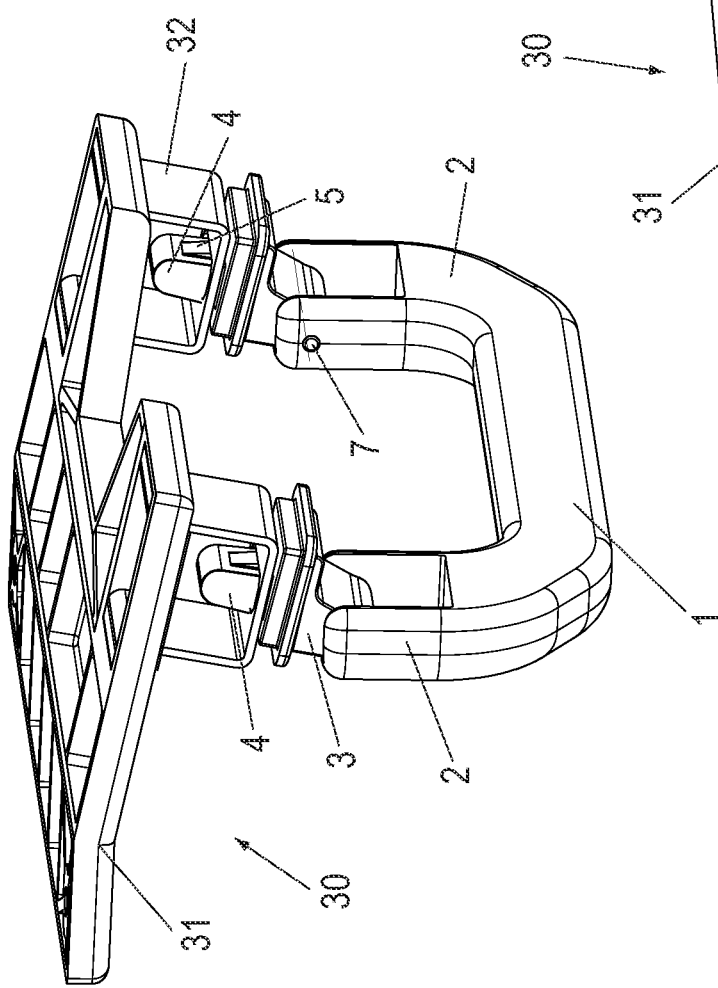
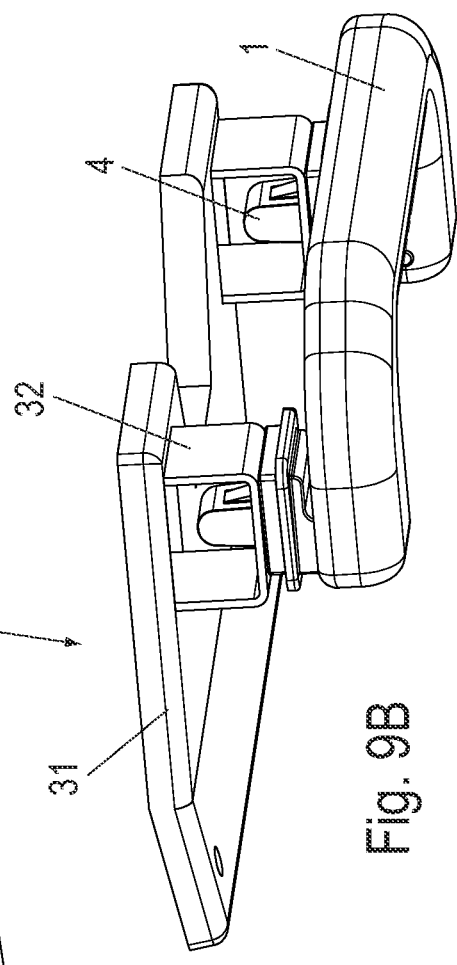

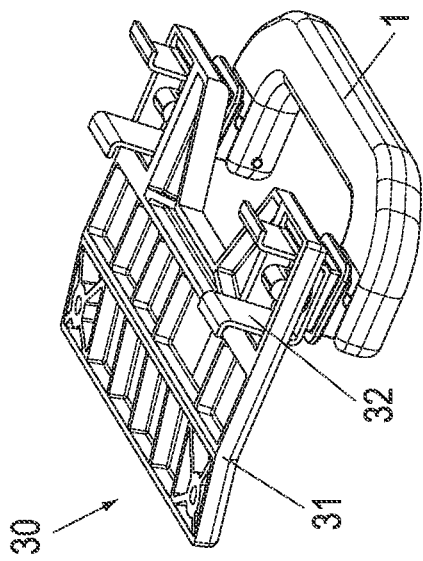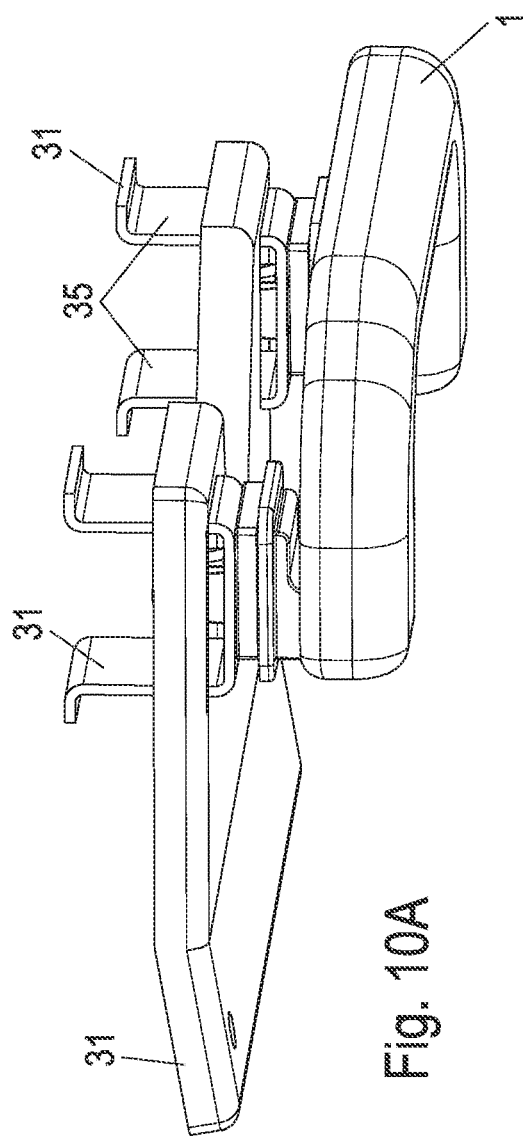

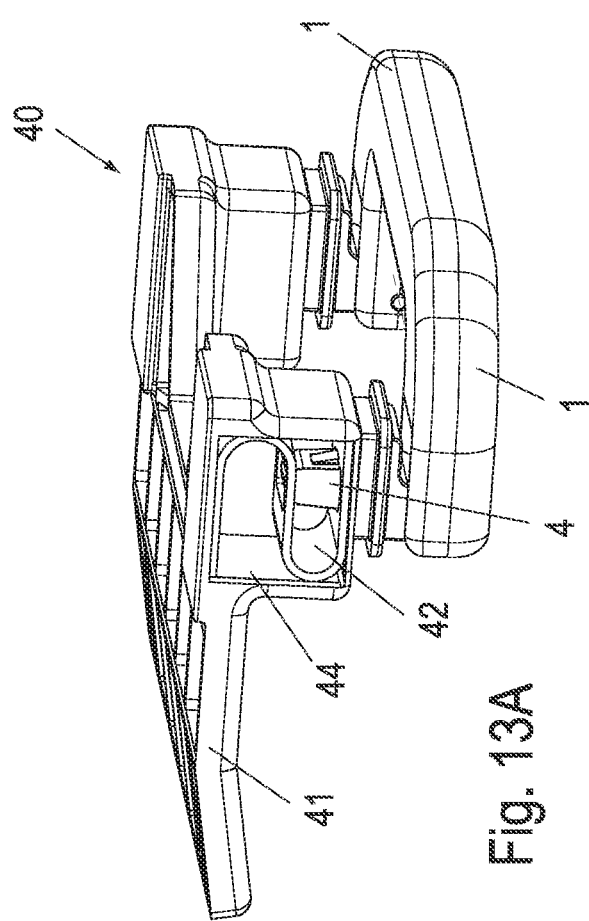
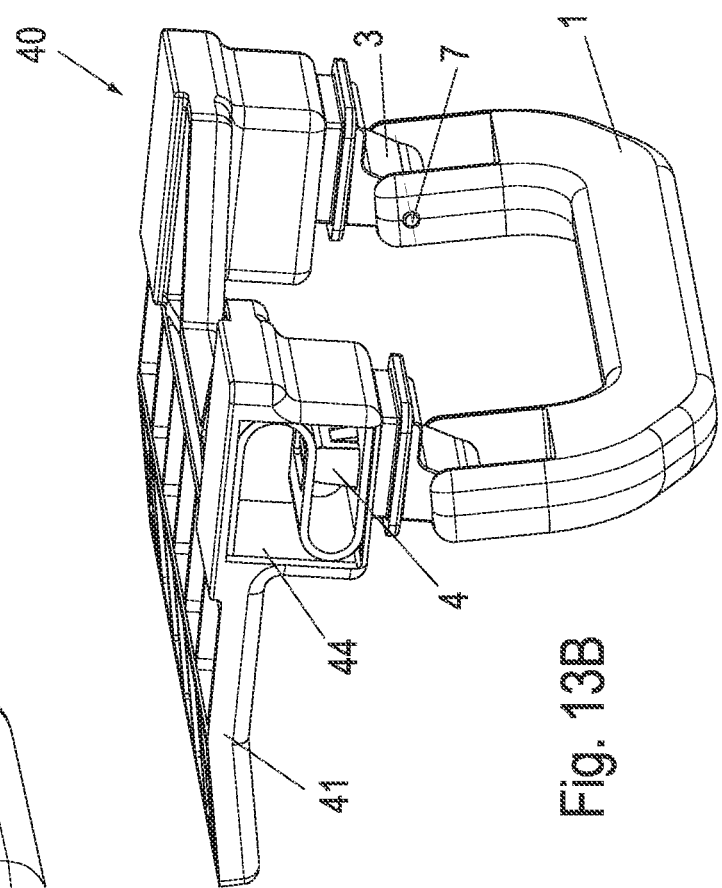

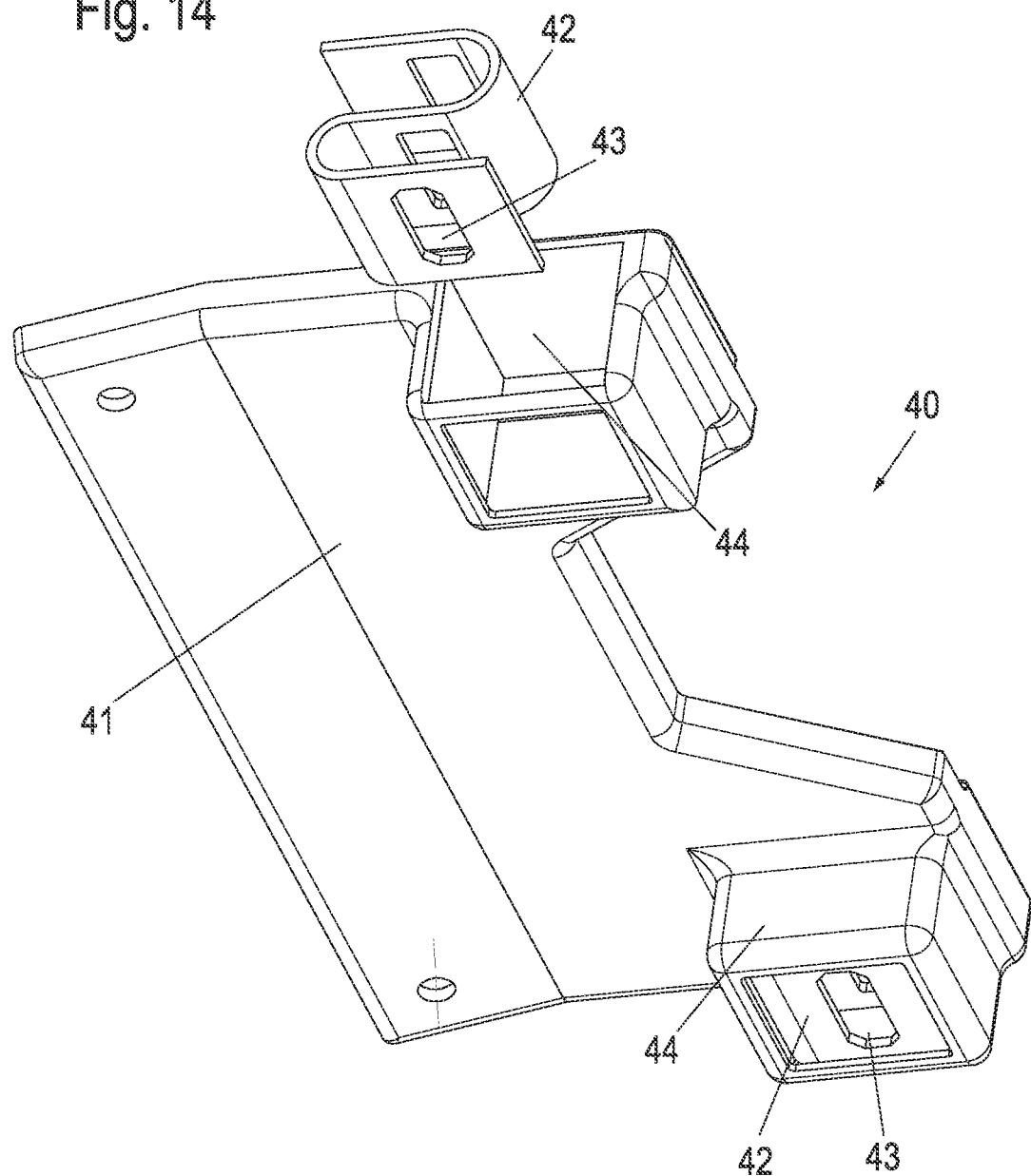

ROOF HANDLE

CROSS-REFERENCE TO RELATED APPLICATIONS

This application claims priority to German Application DE 10 2019 116 492.3, filed Jun. 18, 2019, the entire contents of which is incorporated herein by reference.

BACKGROUND OF THE INVENTION

Field of the Invention

The present invention relates to a roof handle for vehicles with a carrier which can be fixed to a vehicle roof and on which a handle body is pivotably mounted in order to be moved between a holding position in which a user exerts a weight force directed substantially downwards on the handle body, and an initial position in which the handle body is pivoted into a folded-up position relative to the vehicle roof by a handle.

Description of the Related Art

DE 296 04 260 U1 reveals a roof handle which has a bow-shaped handle body which is pivotally mounted via two bearing blocks. The handle bow can thus be grasped by the user and loaded downwards by its weight. After use, the handle bar can be swivelled towards the roof by the force of a spring and thus does not protrude into the vehicle interior. Fastening the two bearing brackets by means of screws and other fasteners is comparatively complex, and the rigidly arranged handle body represents a risk of injury in the event of a collision. The entire unit for fixing the roof handle also has a high weight.

In order to simplify the attachment of such a roof handle, DE 20 2013 005 494 U1 discloses a plate-shaped retaining element for a roof handle, which forms a carrier and can be locked to a roof structure by means of fasteners. This simplifies installation, but the problem remains that the retaining element is made of a steel plate and is relatively heavy. In addition, the rigid fixing of the handle body is disadvantageous because the rigidly arranged handle body represents a risk of injury in the event of a collision.

It is therefore the object of the present invention to create a roof handle which is represents a lower risk of injury.

BRIEF DESCRIPTION OF THE INVENTION

This object is solved with a roof handle with the features of claim 1.

In the case of the roof handle according to the invention, an impact protection is provided on the carrier, by means of which the handle body can be moved relative to the carrier in the event of an impact on the handle body. In this way an impact force can be at least partially absorbed, which reduces the risk of injury.

Preferably, the triggering force for the impact protection is selected such that this triggering force does not cause any movement of the handle body relative to the carrier when the handle body is loaded downwards, i.e. in the holding position, and only moves the handle body in the direction of the carrier when the triggering force is loaded upwards, i.e. in the opposite direction. The release force for impact protection can, for example, be in a range corresponding to a weight force of between 20 kg (44.1 lbs.) and 120 kg (264.6 lbs.), preferably between 30 kg (66.1 lbs.) and 60 kg (132.3 lbs). This can reduce injuries to vehicle occupants, particularly to the head.

The roof handle preferably comprises a carrier with a molded body of plastic on which at least one insert of metal is provided, preferably two inserts spaced apart from each other, a bearing element of the handle body being held on each insert. For this purpose, a fastening element can be provided on each bearing element, which is inserted, for example, into an opening in the insert.

According to a first embodiment, the impact protection can be formed in that bendable or separable webs are formed on the molded plastic body, which allow the handle body to be moved upwards, i.e. towards the vehicle roof, in the event of an impact load, but are dimensionally stable in the opposite direction when the user pulls the handle body downwards. Corresponding webs can be bendable or provided with predetermined breaking points to form the impact protection.

In a further embodiment, the impact protection can be formed in that the metal insert can be moved or swivelled relative to the molded body. For example, the insert can be formed by a U-shaped, bent metal web on which outwardly directed projections are formed which rest against a stop of the molded body. The stop ensures that the insert cannot move downwards when a tensile force is applied, but that it can move upwards when an impact force is applied. The insert is thus held on the molded body so that it can only be moved in one direction. To avoid a smooth upward movement of the insert, it can be clamped to the molded body or glued to it. Alternatively, a holding bar can be provided so that an upward movement of the handle body is only possible when a certain release force is exceeded.

In another embodiment of impact protection, an insert is provided which has a curved structure, e.g. a Z-shaped arch, so that the curved insert can be deformed when an impact load is applied. This allows impact forces to be effectively absorbed. The insert can either be plastically deformed or designed as a leaf spring and allow reversible deformation. The bending of the insert can also be U-shaped, S-shaped or meandering to allow the handle body to move in the event of an impact. Alternatively or additionally, the insert can act on a compressible absorber element to fix the bearing element of the handle body when the release force is reached.

In a further embodiment of impact protection, a molded plastic body can have a retaining structure which has a retaining web which is loaded in tension when a weight is applied to the handle body and is loaded in compression when a force is applied by an impact on the handle body. When subjected to a compressive load, the retaining web can buckle, for example at a predetermined predetermined buckling point, in order to allow the handle body to move over the retaining structure towards the carrier. Such holding structures can be achieved, for example, by means of inclined webs where the holding web is fixed at the end.

The different embodiments of impact protection can also be combined with each other to ensure particularly effective absorption of impact forces.

BRIEF DESCRIPTION OF THE DRAWINGS

The invention is explained in more detail below by means of several embodiments with reference to the attached drawings, which show:

FIGS. 1A to 1C illustrate several views of a first example of a roof handle according to the invention;

FIGS. 3A and 3B illustrate two views of the roof handle of FIG. 1, partially in section;

FIGS. 4A and 4B illustrate two views of a roof handle as shown in a second example;

FIG. 5 is a perspective exploded view of the roof handle of FIG. 4;

FIG. 7 is a perspective view of the carrier of FIG. 4;

FIG. 8 is a perspective view of the metal insert of the carrier of FIG. 7;

FIGS. 9A and 9B illustrate two views of a third example of a roof handle in accordance with the invention, FIGS. 10A and 10B illustrate two views of the roof handle of FIG. 9 after an impact;

FIGS. 13A and 13B illustrate two views of a fourth embodiment of a roof handle of the invention;

FIG. 14 is a perspective exploded view of the carrier of the roof handle of FIG. 13;

DETAILED DESCRIPTION OF THE INVENTION

Figure 1C:
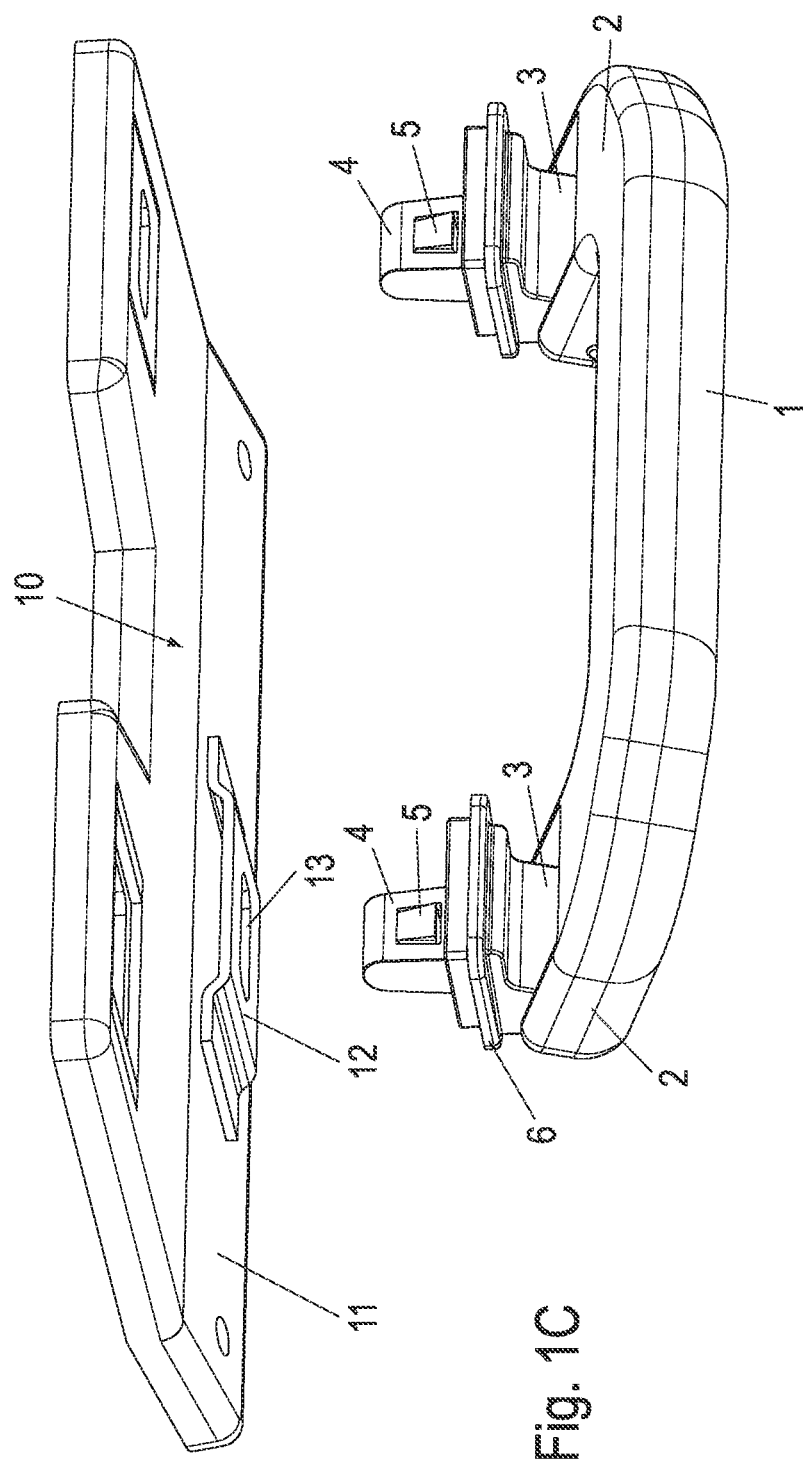

A roof handle comprises a handle body 1, which has a bow-shaped design and is pivotally mounted at two curved end sections 2 each on a bearing element 3. Each bearing element 3 comprises a fastening element 4, on which one or more bendable latching webs 5 are provided to lock the handle body 1 to a carrier 10. In addition, each bearing element 3 is provided with a frame 6 which can be mounted on a vehicle roof, in particular can be inserted into a receptacle on the vehicle roof.

The carrier 10 comprises a substantially plate-shaped molded body 11 made of plastic on which two receptacles are formed at which the fastening elements 4 are inserted. As can be seen in FIG. 1C, the fastening elements 4 are not inserted into the plastic molded body 11, but an insert 12 made of metal, which has an opening 13, in particular a substantially rectangular opening 13, into which the fastening element 4 is inserted, the latching webs 5 locking behind the insert 12 and thus preventing the fastening elements 4 from being pulled out after assembly.

Figure 2B:
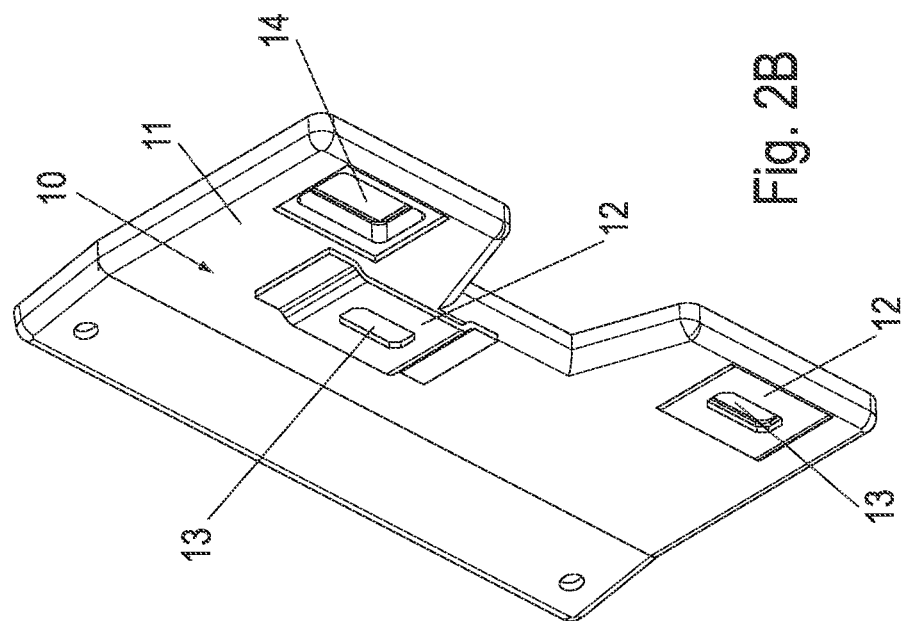
FIGS. 2A and 2B illustrate two views of the carrier of the roof handle of FIG. 1.
Figure 2A:
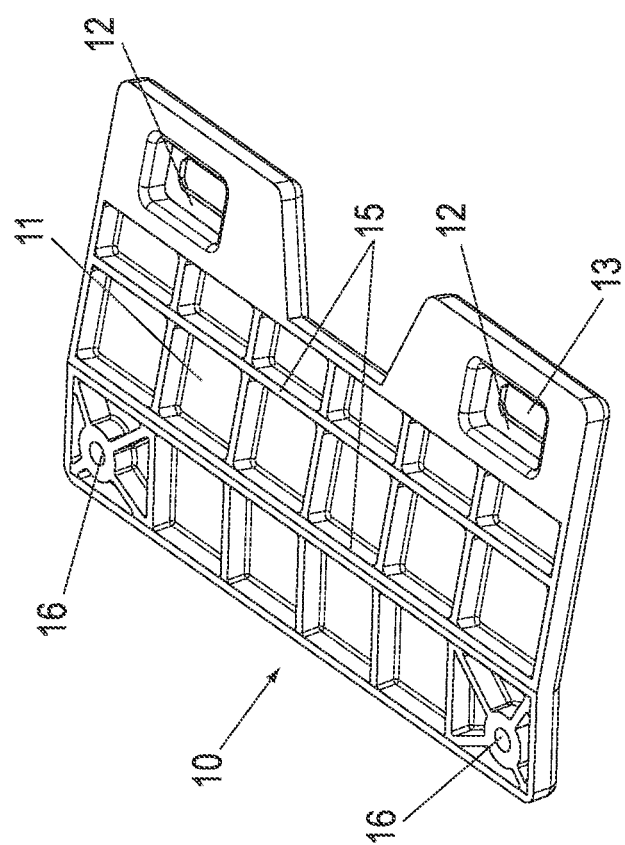

FIGS. 2A and 2B show the molded body 11, which has a stiffening structure formed by webs 15. The webs 15 can be lattice, truss or other geometry to make the molded body 11 stable but with a low dead weight. In addition, two openings 16 for fasteners are provided in the molded body 11 to fix the molded body 11 to a vehicle roof.

The metal inserts 12 are stepped on opposite end faces, the stepped area being at least partially injection molded into the molded body 11. For this purpose, receptacles with openings 14 are provided in the molded body 11, so that a fastening element 4 can be inserted both through the opening 13 on the insert 12 and through the opening 14 of the molded body 11.

FIGS. 3A and 3B show the mounted position of the handle body 1 on the carrier 10. The slightly angled molded body 11 is penetrated by the fastening element 4, which is fixed to the metal insert 12. This means that only the highly stressed area is made of metal, while the lighter molded body 11 is used for the remaining area.

In order to form an impact protection which enables the handle body 1 to be moved towards the carrier 10 in the event of a release force with an upward direction of action, the webs 15 of the molded body can be designed accordingly and can optionally bend or separate via predetermined breaking points to enable the handle body 1 to move relative to the molded body 11 in the event of an impact. If the handle body 1 is loaded by a force of the same magnitude, i.e. a "release force", which acts downwards by pulling on the handle body 1 in the mounted position of the handle body 1, the handle body 1, on the other hand, remains stable on the carrier 10.

The following figures show further embodiments of a roof handle, whereby the handle body 1 and the bearing elements 3 are designed as in the first embodiment. Therefore, the same reference signs are used. Only the carriers are each designed with different impact protection.

FIGS. 4A and 4B show a carrier 20 which has a molded body 21 made of plastic to which two metal inserts 22 are fixed, preferably by injection molding. The metal insert 22 is not embedded in the molded body 21 but protrudes from it. The fastening elements 4 are inserted into a section of the insert 22, which is arranged at a distance from the plastic molded body 21. The fastening elements 4 are locked into place at one opening each of an insert 22. FIG. 4A shows the starting position in which the handle body 1 is swung upwards towards a vehicle roof. FIG. 4B shows the handle body 1 in a holding position in which a user exerts a substantially downward weight force on the handle body 1.

FIG. 5 shows handle body 1 removed from carrier 20. The carrier 20 comprises a substantially plate-shaped molded body 21, reinforced by a stiffening structure formed by webs. In the molded body 21 there are openings 26 for fasteners to fix the molded body 21 to a vehicle roof.

The two inserts 22 made of a bent metal sheet comprise a retaining web 25 embedded in the molded body 21. An inclined web 28 extends from the retaining web 25, which is connected to the retaining web 25 via a bend 27. The inclined web 28, for example, is inclined at an angle between 50° and 80° to the retaining web 25. An angled web 29 extends from the inclined web 28, which is aligned substantially perpendicular to the retaining web 25 and on which an angled end section 24 is integrally formed, which in each case has an opening 23, in particular a substantially rectangular opening 23, into which a fastening element 4 is inserted. Each insert 22 is thus bent essentially in a Z-shape, whereby other geometries of inserts 22 can also be provided.

Figure 6A:
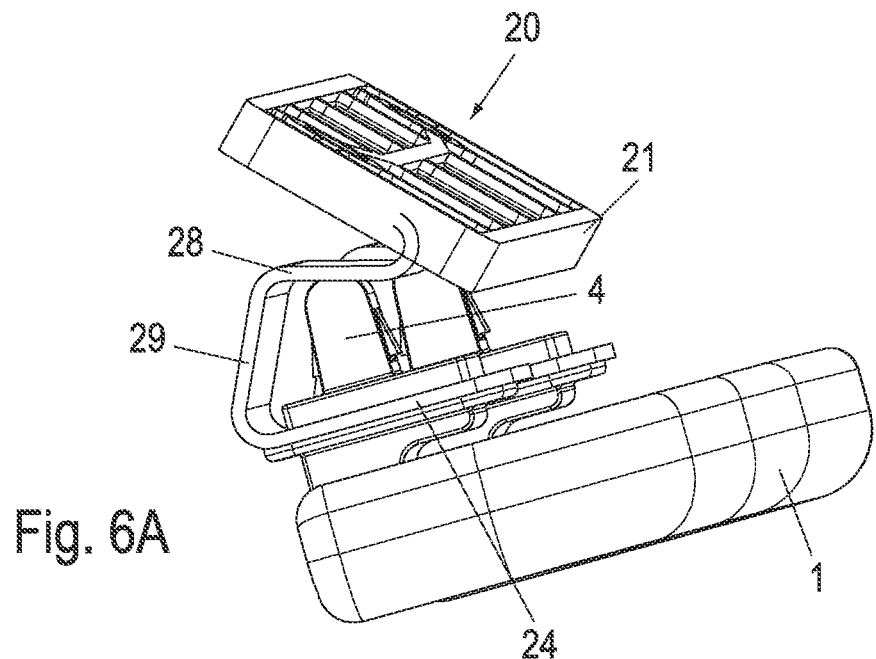
FIGS. 6A and 6B illustrate two views of the roof handle of FIG. 4 after an impact.
Figure 6B:
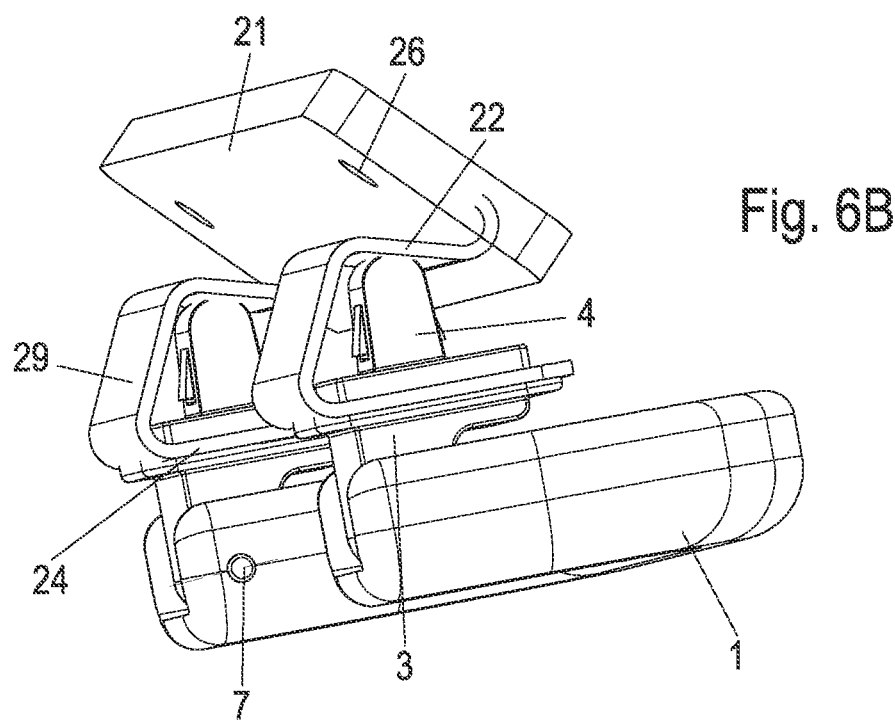

The shape of insert 22 provides effective impact protection, as shown in FIGS. 6A and 6B. If the handle body 1 in the initial position of FIG. 4A is subjected to an upward impact load in the direction of the vehicle roof, the insert 22 is bent when the release force is reached, which can correspond, for example, to a weight force of between 20 kg (44.1 lbs.) and 120 kg (264.6 lbs.). This allows the handle body 1 to be moved in the direction of the vehicle roof in order to absorb impact forces and thus minimise injury from handle body 1. As the comparison of FIGS. 5 and 6 shows, the impact moved the end section 24 in the direction of the molded body 21. Due to the arrangement of the inclined web 28, the web-shaped insert 22 can be deformed at the bend to allow the handle body 1 to move in the direction of molded body 21.

FIG. 7 shows the carrier 20 without the handle body 1. It can be seen that two spaced inserts 22 are provided, which are only connected to each other via the plastic molded body 21. In this embodiment, the molded body 21 has a web-shaped design, where another geometry can also be used.

FIG. 8 shows the insert 22, and it can be seen that the retaining web 25 has an opening 26 which is aligned with the opening 26 on the molded body 21, so that fasteners can fix both the molded body 21 and the insert 22 to a vehicle roof.

FIGS. 9 to 12 show a further example of a roof handle, whereby FIG. 9A shows the handle body in a holding position where the user pulls on the handle body 1, while FIG. 9B shows the handle body 1 in a folded up starting position. The handle body 1 is fixed to a carrier 30 via fastening elements 4, the carrier 30 having a molded body 31 made of plastic and two inserts 32 made of a bent metal sheet. In this case, the two inserts 32 are bent into a U-shape and have an opening at a base section through which the fastening elements 4 are inserted.

In order to provide the handle body 1 with impact protection, the inserts 32 are arranged so that they can be moved upwards when a load is applied, i.e. towards the molded body 31, when a release force is exceeded, as shown in the FIGS. 10A and 10B. When the release force is exceeded, e.g. a force corresponding to a weight of 20 kg (44.1 lbs.) to 120 kg (264.6 lbs.), the handle body 1 can be moved towards the molded body 31, whereby the two legs 35 of the insert 32 are displaced relative to the molded body 31. The insert 32 has outwardly angled projections 36 on the two legs 35 which, in the assembled position of FIG. 9, prevent the handle body 1 from moving downwards, but allow the handle body 1 to be moved upwards once a certain release force has been reached.

Figure 11:
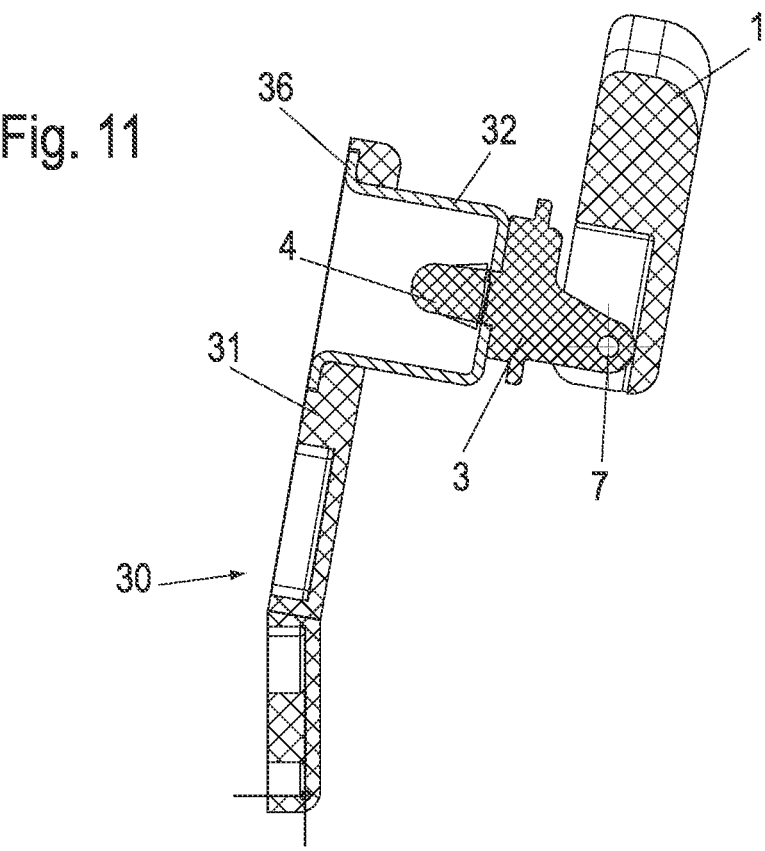
FIG. 11 is a sectional view of the roof handle of FIG. 9B.

As can be seen in the sectional view of FIG. 11, the projections 36 are in contact with the molded body 31 in the assembled position, thus preventing handle body 1 from moving downwards at the bearing elements 3. The insert 32 can be force-fitted to the molded body, for example by means of certain clamping forces, which only allow the insert 32 to be moved towards the molded body 31 when a release force is exceeded.

Figure 12:
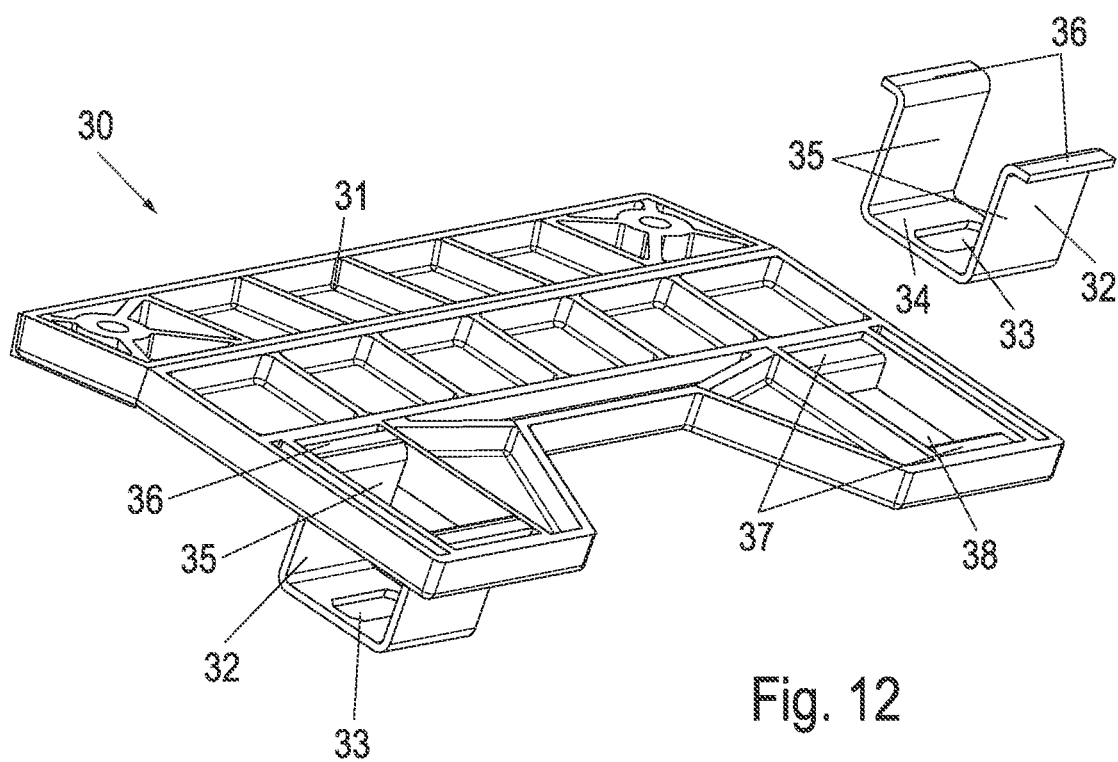
FIG. 12 is an exploded perspective view of the roof handle carrier of FIG. 9.

FIG. 12 shows an exploded view of the carrier 30 in part. Molded body 31 made of plastic is essentially plate-shaped and comprises a stiffening structure formed by webs. In addition, openings 38 are formed in two web-shaped sections of the molded body 31, where a stop 37 is provided which interacts with the projections 36 of the insert 32. This allows the inserts 32 to be inserted through the opening 38. Then a bearing element 3 can be fixed to a base 34 of the insert 32 by a fastening element 4. Two legs 35 extend from the base 34 to the molded body 31, on which the projections 36 are supported by the stop 37.

To adjust the release force when the handle body 1 is loaded upwards, i.e. towards the molded body 31, the projections 36 can be glued to the molded body 31. Alternatively, a web with a predetermined breaking point or another component can be provided which releases the insert 32 only when a certain release force is exceeded, so that the insert 32 can then be moved relative to the molded body 31.

FIGS. 13A and 13B show a further example of a roof handle in which the handle body 1 is shown in an initial position as shown in FIG. 13A and in a holding position in which the handle body 1 has been swung downwards as shown in FIG. 13B. A carrier 40 for fixing the handle body 1 comprises a molded body 41 made of plastic on which an insert 42 made of a metal sheet is held. In this example, the insert 42 made of a metal sheet is designed as a bent leaf spring, which is arranged in a receptacle, in particular a chamber 44 of the molded body 41. The insert 42 comprises an opening 43 at one end section for the insertion of a fastening element 4. When the handle body 1 is loaded downwards, the fastening element 4 is held on the plastic molded body 41 via the end section of the insert, and no relative movement takes place between handle body 1 and molded body 41. If, on the other hand, the handle body 1 is loaded by an upward force towards the molded body 41, the insert 42 can deform, as it is made of a flexible metal sheet. Then the insert 42 can be moved within the chamber 44 on the molded body 41 to move the handle body 1 upwards and thereby absorb impact forces.

FIG. 14 shows the carrier 40 in detail. Integral with the molded body 41 is a chamber 44 or receptacle into which the S-shaped insert 42 can be inserted laterally. An end section of the insert 42 with the opening 43 is held against stops of the chamber 44 and therefore cannot be pulled out downwards through an opening in the chamber 44. If a load is applied in the opposite direction, the insert 42 can be deformed, whereby several aligned openings are provided on the insert 42, through which the fastening element 4 can then be inserted in the event of an impact.

Figure 15A:
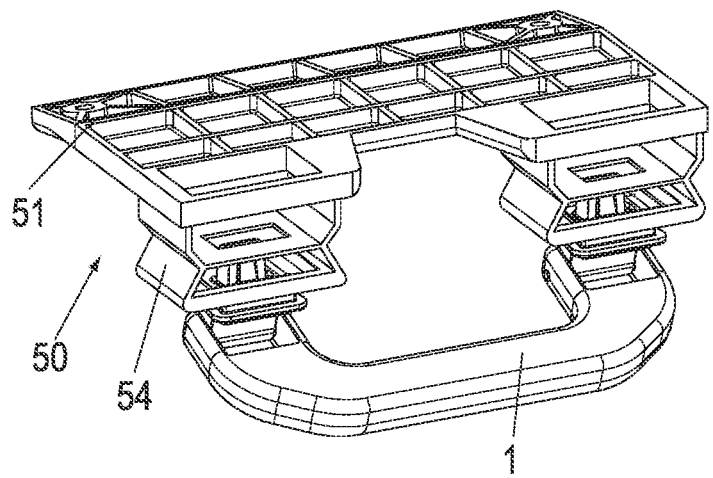
FIGS. 15A to 15C illustrate multiple views of a fifth example of a roof handle of the invention.
Figure 15B:
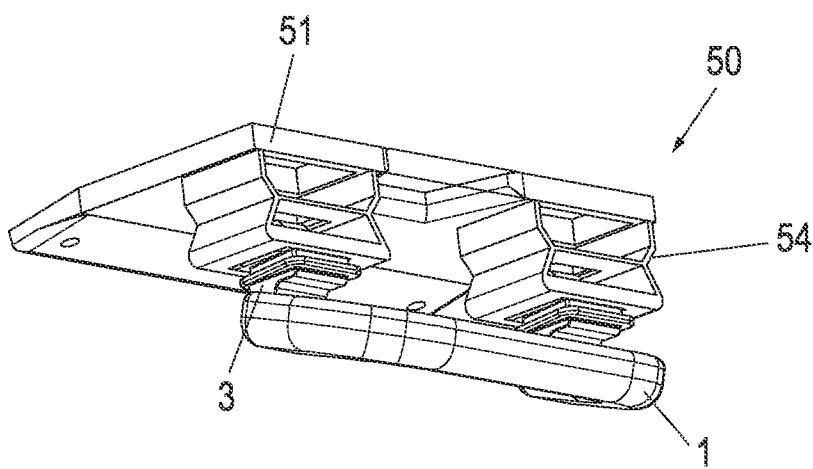
Figure 15C:
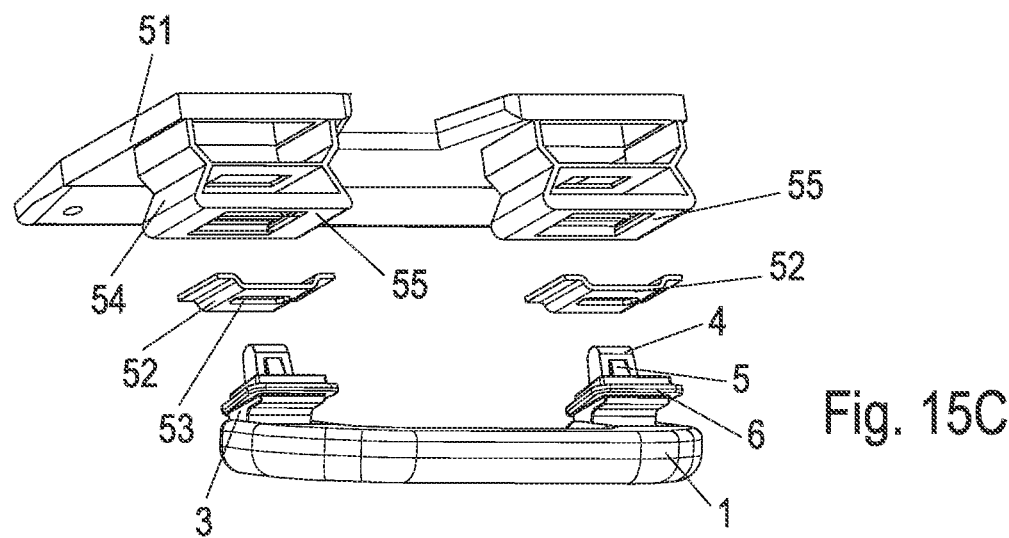
Figure 16:
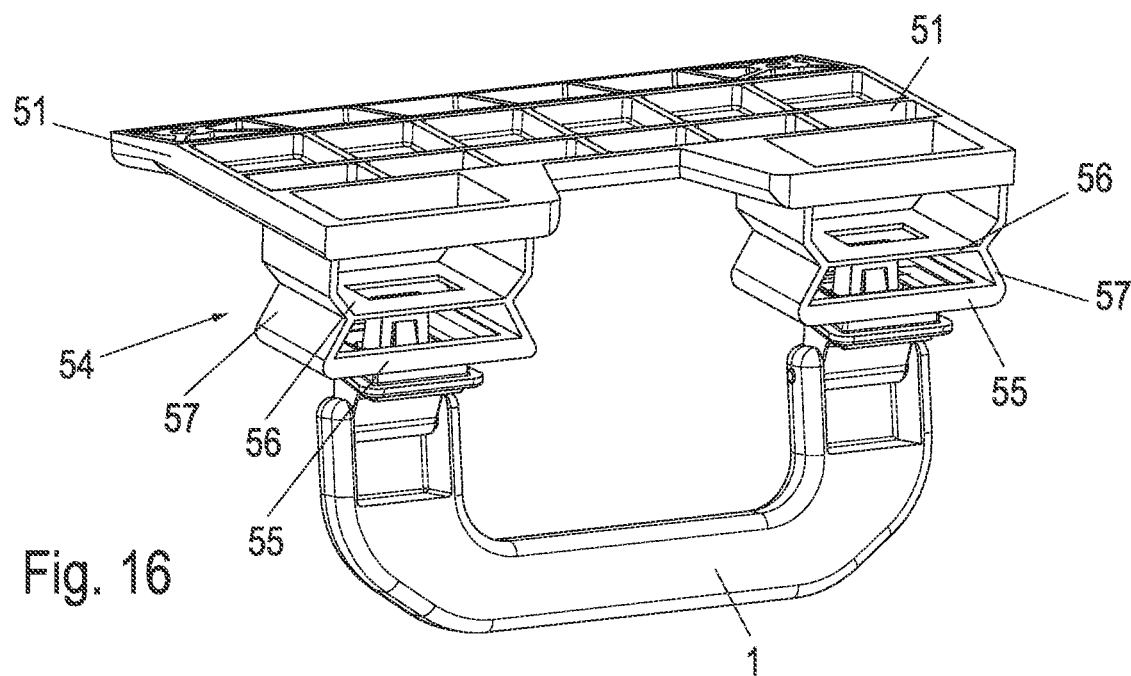
FIG. 16 is a view of the roof handle of FIG. 15 in a holding position.
Figure 17:
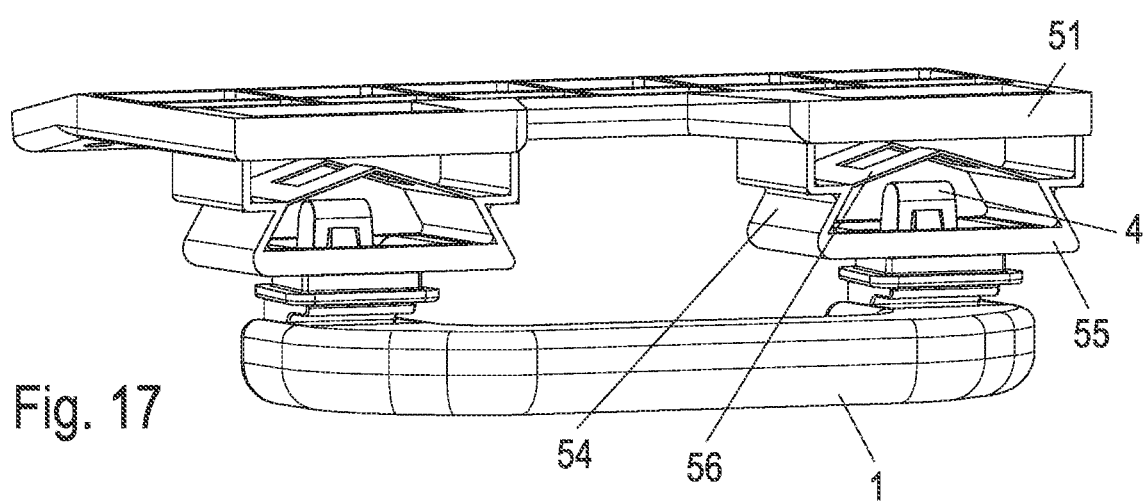
FIG. 17 is a view of the roof handle of FIG. 15 after an impact.

FIGS. 15 to 17 show a further embodiment of a roof handle. A handle body 1 is held on a carrier 50 which comprises a molded body 51 made of plastic material which has an integrally formed retaining structure 54 as impact protection. An insert 52 made of a metal sheet with an opening 53 is fixed, preferably injection molded or glued, to the retaining structure 54 at an opening on a web 55. The insert 52 is firmly attached to the retaining structure 54 and serves to fix the two bearing elements 3 via the fastening elements 4. The retaining structure 54 comprises a shaping that acts as impact protection. FIG. 16 shows the handle body 1 in a holding position in which a user holds on to the handle body 1 and loads it vertically downwards. In this position, a retaining web 56, which is located at a distance from web 55 for fixing the insert 52, is subjected to tensile stress. This tensile stress results from the fact that the web 55 is connected to the retaining web 56 via two inclined webs 57, whereby the inclined webs 57 converge to the retaining web 56. The inclined web 57 is part of a V-shaped section of the retaining structure 54, at the tip of which the retaining web 56 is formed, so that the retaining web 56 is subjected to tensile stress when the handle body 1 is loaded downwards.

If the handle body 1 is swung back to its original position by a spring and then subjected to an impact which presses the handle body 1 towards the carrier 50, the retaining structure causes the retaining web 56 to buckle when a trigger force is exceeded, as shown in FIG. 17. Via the inclined webs 57, a compressive force is exerted on the retaining web 56, which then buckles, for example also by means of a corresponding predetermined buckling pin, thus enabling the web 55 with the insert 52 to move towards the molded body 51. This allows the handle body 1 to be moved relative to the molded body 51 in order to absorb impact forces.

Figure 18:
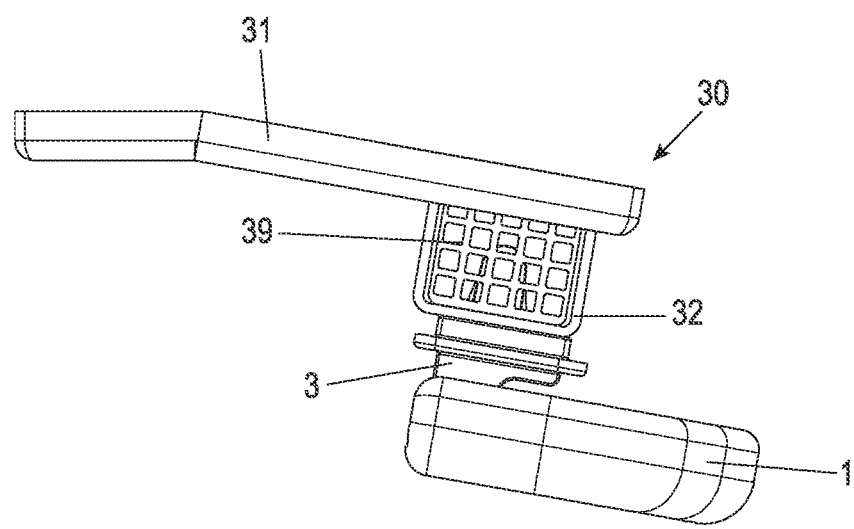
FIG. 18 shows an alternative embodiment of the roof handle shown in FIG. 9.

FIG. 18 shows a variant of the roof handle shown in FIGS. 9 to 12. As already described, the inserts 32 can be moved upwards relative to molded body 31 when a load is applied. However, an absorber element 39 is provided to absorb the impact energy, for example a foam, elastic plastic or other material which is compressed between the base 34 and the stop on the molded body 31 when the insert 32 is moved. The absorber element 39 thus has a similar function to the spring-shaped insert 42 in FIG. 13.

The above-described embodiments with the impact protection can also be combined with each other in any desired combination in order to brake the handle body 1 even more effectively in the event of an impact.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

The invention claimed is:

1. A roof handle for vehicles, comprising:
   a carrier configured to be fixed to a vehicle roof, wherein the carrier comprises:
   a molded body of plastic, and
   at least one metal insert;
   a handle body pivotably mounted to the carrier, wherein
   the handle body is pivotable between a holding position and a starting position,
   the handle body is configured to receive a substantially downwardly directed weight force exerted on the handle body by a user in the holding position and configured to receive a return force from a spring to pivot the handle body back to the starting position, which is a folded-up position relative to the vehicle roof, and
   the handle body includes at least one bearing element configured to hold the handle body on the at least one metal insert; and
   an impact protection device configured to move the handle body towards the carrier in the case of an impact with the handle body.

2. The roof handle of claim 1, wherein the handle body is configured to remain mounted on the carrier in its original relationship to the carrier when a triggering force for the impact protection is applied downwards away from the carrier and the handle body is configured to move towards the carrier when the triggering force for the impact protection is applied upwards towards the carrier.

3. The roof handle of claim 2, wherein the triggering force for the impact protection corresponds to a weight force between 20 kg and 120 kg.

4. The roof handle of claim 1, wherein the impact protection device is formed by bendable or separable webs on the molded body.

5. The roof handle of claim 1, wherein the impact protection device is formed by the at least one metal insert which is displaceable or pivotable relative to the molded body when a release force is exceeded.

6. The roof handle of claim 5, wherein the at least one metal insert is formed by a metal web bent in a U-shape having two limbs forming each side of the U-shape, and wherein the metal web has an outwardly bent projection on the two limbs.

7. The roof handle according to claim 6, wherein the molded forms a stop for the at least one metal insert for downward movement, and the at least one metal insert is held on the molded body so as to be displaceable upwards.

8. The roof handle of claim 1, wherein the impact protection device comprises a bendable insert on which a bearing element for the handle body is held.

9. The roof handle of claim 8, wherein the bendable insert has a metal web bent substantially in a Z-shape.

10. A roof handle for vehicles, comprising:
    a carrier configured to be fixed to a vehicle roof;
    a handle body pivotably mounted to the carrier, wherein the handle body is pivotable between a holding position and a starting position and wherein the handle body is configured to receive a substantially downwardly directed weight force exerted on the handle body by a user in the holding position and configured to receive a return force from a spring to pivot the handle body back to the starting position, which is a folded-up position relative to the vehicle roof;
    an impact protection device configured to move the handle body towards the carrier in the case of an impact with the handle body; and
    a plurality of bearing elements, wherein the handle body is held on the carrier by the plurality of bearing elements and the bearing elements are displaceable relative to the carrier when a release force is exceeded.

11. A roof handle for vehicles, comprising:
    a carrier configured to be fixed to a vehicle roof;
    a handle body pivotably mounted to the carrier, wherein the handle body is pivotable between a holding position and a starting position and wherein the handle body is configured to receive a substantially downwardly directed weight force exerted on the handle body by a user in the holding position and configured to receive a return force from a spring to pivot the handle body back to the starting position, which is a folded-up position relative to the vehicle roof; and
    an impact protection device configured to move the handle body towards the carrier in the case of an impact with the handle body, wherein the carrier has a molded body of plastic with a retaining structure which has a retaining web which is loaded in tension when a downwardly directed weight force is applied to the handle body and in compression when an upwardly directed force is applied to the handle body, and the retaining web can be bent when a compressive load is applied in order to move the handle body relative to the moulded body.

12. A roof handle for vehicles, comprising:
    a carrier configured to be fixed to a vehicle roof;
    a handle body pivotably mounted to the carrier, wherein the handle body is pivotable between a holding position and a starting position and wherein the handle body is configured to receive a substantially downwardly directed weight force exerted on the handle body by a user in the holding position and configured to receive a return force from a spring to pivot the handle body back to the starting position, which is a folded-up position relative to the vehicle roof; and
    an impact protection device configured to move the handle body towards the carrier in the case of an impact with the handle body, wherein the carrier has an insert for fixing a bearing element of the handle body, which is designed as a bent leaf spring.

13. A roof handle for vehicles, comprising:
    a carrier configured to be fixed to a vehicle roof;

a handle body pivotably mounted to the carrier, wherein the handle body is pivotable between a holding position and a starting position and wherein the handle body is configured to receive a substantially downwardly directed weight force exerted on the handle body by a user in the holding position and configured to receive a return force from a spring to pivot the handle body back to the starting position, which is a folded-up position relative to the vehicle roof; and an impact protection device configured to move the handle body towards the carrier in the case of an impact with the handle body, wherein the carrier has an insert for fixing a bearing element of the handle body, which acts on a compensable absorber element when the release force is reached.

14. A roof handle for a vehicle, comprising:

a carrier configured to be mounted to a roof of the vehicle;

an impact protection device fixed to the carrier; and a handle body pivotably mounted to the impact protection device, wherein the impact protection device is configured to maintain the mounting relationship of the handle body to the carrier when a triggering force is applied to the handle body in a direction away from the carrier and the impact protection device is configured to move the handle body towards the carrier when the triggering force is applied to the handle body in a direction towards the carrier, wherein the carrier has a molded body of plastic and wherein the impact protection device is a retaining web integrally formed in the molded body.

15. A roof handle for a vehicle, comprising:

a carrier configured to be mounted to a roof of the vehicle;

an impact protection device fixed to the carrier; and a handle body pivotably mounted to the impact protection device, wherein the impact protection device is configured to maintain the mounting relationship of the handle body to the carrier when a triggering force is applied to the handle body in a direction away from the carrier and the impact protection device is configured to move the handle body towards the carrier when the triggering force is applied to the handle body in a direction towards the carrier, wherein the carrier has a molded body of plastic and wherein the impact protection device is a metal insert, the metal insert is configured to be mounted to the carrier and is configured to receive the handle body.

16. The roof handle of claim 15 wherein the metal insert is formed in a U-shape having a first limb and a second limb, and wherein each of the first and second limbs includes an outwardly bent projection.

17. The roof handle of claim 15 wherein the metal insert is formed in a Z-shape.

18. The roof handle of claim 15 wherein the metal insert is formed as a bent leaf spring.

* * * * *